United States Patent
Preuβ et al.

(10) Patent No.: US 9,863,501 B2
(45) Date of Patent: Jan. 9, 2018

(54) DOUBLE CLUTCH TRANSMISSION

(71) Applicant: ZF Friedrichshafen AG, Friedrichshafen (DE)

(72) Inventors: Michael Preuβ, Meersburg (DE); Bernd Schepperle, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 193 days.

(21) Appl. No.: 14/833,266

(22) Filed: Aug. 24, 2015

(65) Prior Publication Data
US 2016/0061294 A1    Mar. 3, 2016

(30) Foreign Application Priority Data

Aug. 28, 2014   (DE) .......................... 10 2014 217 197

(51) Int. Cl.
| | |
|---|---|
| *F16H 3/08* | (2006.01) |
| *F16H 3/091* | (2006.01) |
| *F16H 3/00* | (2006.01) |

(52) U.S. Cl.
CPC ........... *F16H 3/0915* (2013.01); *F16H 3/006* (2013.01); *F16H 2003/0807* (2013.01); *F16H 2200/006* (2013.01); *F16H 2200/0052* (2013.01); *F16H 2200/0056* (2013.01); *F16H 2200/0086* (2013.01)

(58) Field of Classification Search
CPC ....................... F16H 37/021; F16H 2003/0931
USPC ................... 74/330, 331, 333, 340
See application file for complete search history.

(56) References Cited

U.S. PATENT DOCUMENTS

| 7,231,843 B2 * | 6/2007 | Gumpoltsberger ..... F16H 3/006 74/329 |
| 7,287,443 B2 * | 10/2007 | Kuhstrebe ......... B60W 30/1819 192/219 |
| 7,552,658 B2 * | 6/2009 | Forsyth ................... F16H 3/006 74/329 |

(Continued)

FOREIGN PATENT DOCUMENTS

| DE | 10 2004 022 414 A1 | 12/2005 |
| DE | 10 2012 201 680 A1 | 8/2013 |

OTHER PUBLICATIONS

German Search Report Corresponding to 10 2014 217 197.0 dated Nov. 13, 2015.

*Primary Examiner* — Ha D Ho
(74) *Attorney, Agent, or Firm* — Davis & Bujold PLLC; Michael J. Bujold

(57) ABSTRACT

A dual-clutch transmission having first and second clutches which selectively engage to couple a drive shaft with a respective first and second input shaft. The input shafts are coaxially aligned with the first input shaft extending through the second input shaft. A transmission output shaft is coaxially aligned with and extends behind the input shafts. Either six, seven or eighth forward gears and at least two reverse gears are produced by gearwheels that are arranged in six gearwheel planes on the input and the output shafts and a countershaft. The gearwheel planes are sequentially arranged axially along the transmission. Depending on the shifting positions of eight interlocking shifting elements, when six forward gears are provided, the last forward gear is a direct gear. In contrast, when either seven or eight forward gears are provided, the last forward gear, in each case, is an overdrive gear.

15 Claims, 2 Drawing Sheets

(56) References Cited

U.S. PATENT DOCUMENTS

| | | | | |
|---|---|---|---|---|
| 8,011,261 B2* | 9/2011 | Diemer | ............... | F16H 3/006 74/330 |
| 8,051,732 B2* | 11/2011 | Gitt | ............ | F16H 3/006 74/330 |
| 8,201,469 B2* | 6/2012 | Akashi | ................ | F16H 3/006 74/329 |

* cited by examiner

|    | K1 | K2 | S1 | S2 | S3 | S4 | S5 | S6 | S7 | S8 |
|----|----|----|----|----|----|----|----|----|----|----|
| 1  |    | X  |    |    |    | X  |    |    |    |    |
| 2  | X  |    |    |    | X  |    |    | X  | X  |    |
| 3  |    | X  |    |    | X  |    |    |    |    | X  |
| 4  | X  |    |    | X  |    |    |    | X  |    |    |
| 5  |    | X  |    | X  |    |    |    |    | X  | X  |
| 6  | X  |    | X  |    |    |    |    |    |    |    |
| R1 | X  |    |    |    |    |    | X  | X  | X  | X  |
| R2 |    | X  |    |    |    |    | X  |    |    |    |

Fig. 2

|    | K1 | K2 | S1 | S2 | S3 | S4 | S5 | S6 | S7 | S8 |
|----|----|----|----|----|----|----|----|----|----|----|
| 1  |    | X  |    |    |    | X  |    |    |    |    |
| 2  | X  |    |    |    | X  |    |    | X  | X  |    |
| 3  |    | X  |    |    | X  |    |    |    |    | X  |
| 4  | X  |    |    | X  |    |    |    | X  |    |    |
| 5  |    | X  |    | X  |    |    |    |    | X  | X  |
| 6  | X  |    | X  |    |    |    |    |    |    |    |
| 7  |    | X  | X  |    |    |    |    | X  | X  | X  |
| R1 | X  |    |    |    |    |    | X  | X  | X  | X  |
| R2 |    | X  |    |    |    |    | X  |    |    |    |

Fig. 3

|    | K1 | K2 | S1 | S2 | S3 | S4 | S5 | S6 | S7 | S8 |
|----|----|----|----|----|----|----|----|----|----|----|
| 1  | X  |    |    |    |    | X  |    | X  | X  | X  |
| 2  |    | X  |    |    |    | X  |    |    |    |    |
| 3  | X  |    |    |    | X  |    |    | X  | X  |    |
| 4  |    | X  |    |    | X  |    |    |    |    | X  |
| 5  | X  |    |    | X  |    |    |    | X  |    |    |
| 6  |    | X  |    | X  |    |    |    |    | X  | X  |
| 7  | X  |    | X  |    |    |    |    |    |    |    |
| 8  |    | X  | X  |    |    |    |    | X  | X  | X  |
| R1 | X  |    |    |    |    |    | X  | X  | X  | X  |
| R2 |    | X  |    |    |    |    | X  |    |    |    |

Fig. 4

DOUBLE CLUTCH TRANSMISSION

This application claims priority from German patent application serial no. 10 2014 217 197.0 filed Aug. 28, 2014.

FIELD OF THE INVENTION

The invention concerns a dual-clutch transmission.

BACKGROUND OF THE INVENTION

From DE 10 2004 022 414 A1 a dual-clutch transmission with two partial transmissions is known. The first partial transmission has a first transmission input shaft, with which a first frictional powershift clutch is associated. The second partial transmission has a second, separate transmission input shaft, with which a second frictional powershift clutch is associated. The two partial transmissions cooperate with a common transmission output shaft. The second transmission input shaft is in the form of a hollow shaft which surrounds part of the first transmission input shaft radially on the outside of and coaxially with it. The transmission output shaft extends behind the two transmission input shafts, coaxially with them. The transmission of DE 102004022414 A1 comprises seven or eight axially successively arranged gear planes and eight interlocking shift elements that are involved in the torque transmission, starting from the drive input shaft in the direction of the transmission input shaft, namely to provide seven forward gears and one reverse gear.

SUMMARY OF THE INVENTION

Starting from there, the purpose of the present invention is to provide a new type of dual-clutch transmission.

That objective is achieved by a dual-clutch transmission as discussed below. To provide six forward gears or seven forward gears or eight forward gears and to provide at least two reverse gears, six gearwheel planes arranged axially one behind another, with gearwheels positioned on the first transmission input shaft, the second input shaft, the transmission output shaft and a countershaft that extends axially parallel to these, participate in the transmission of torque starting from the drive input shaft in the direction toward the transmission output shaft, depending on the shifting position of eight interlocking shifting elements, in such manner that when providing six forward gears the last, or sixth forward gear is a direct gear, whereas in contrast, when providing seven forward gears or when providing eight forward gears, the last, namely the seventh or the eighth forward gear is in each case an overdrive gear.

The dual-clutch transmission according to the invention can provide six, or seven, or eight forward gears and two reverse gears, using six gearwheel planes arranged axially one behind another, and eight interlocking shifting elements. The dual-clutch transmission according to the invention has a lightweight, inexpensive and robust structure with a good power-to-weight ratio.

According to an advantageous further development, a gearwheel positioned on the second transmission input shaft and a gearwheel positioned on the countershaft, which form a first gearwheel plane that, as viewed from the drive input shaft, is the smallest distance away from the drive input shaft, are in each case fixed wheels; whereas a gearwheel positioned on the first transmission input shaft, belonging to a second gearwheel plane which is the second-smallest distance away from the drive input shaft as viewed from the latter, is a fixed wheel and a gearwheel positioned on the countershaft, also belonging to the second gearwheel plane, is a loose wheel; whereas a gearwheel positioned on the transmission output shaft and a gearwheel positioned on the countershaft, both of them being loose wheels, form a third gearwheel plane as viewed from the drive input shaft; whereas a gearwheel positioned on the transmission output shaft and a gearwheel positioned on the countershaft, both belong to a fourth gearwheel plane as viewed from the drive input shaft and are each in the form of loose wheels; whereas a gearwheel positioned on the transmission output shaft, which belongs to a fifth gearwheel plane as viewed from the drive input shaft, which fifth gearwheel plane is the second-largest distance away from the drive input shaft, is a loose wheel and a gearwheel positioned on the countershaft and belonging to the fifth gearwheel plane is a fixed wheel; and whereas a gearwheel positioned on the transmission output shaft, which belongs to a sixth gearwheel plane as viewed from the drive input shaft, which gearwheel plane is farthest away from the latter, is a loose wheel and a gearwheel of the sixth gearwheel plane, which gearwheel is positioned on the countershaft, is a fixed wheel. In the area of the second gearwheel plane, a first interlocking shifting element is associated with the first transmission input shaft in such manner that when the interlocking shifting element is closed, the first transmission input shaft is coupled to the transmission output shaft; whereas with the loose wheel of the third gearwheel plane positioned on the transmission output shaft there is associated a second interlocking shifting element in such manner that when the second interlocking shifting element is closed, the loose wheel of the third gearwheel plane positioned on the transmission output shaft is coupled to the transmission output shaft; whereas with the loose wheel of the fourth gearwheel plane positioned on the transmission output shaft there is associated a third interlocking shifting element in such manner that when the third interlocking shifting element is closed, the loose wheel of the fourth gearwheel plane positioned on the transmission output shaft is coupled to the transmission output shaft; whereas with the loose wheel of the fifth gearwheel plane positioned on the transmission output shaft there is associated a fourth interlocking shifting element in such manner that when the fourth interlocking shifting element is closed, the loose wheel of the fifth gearwheel plane positioned on the transmission output shaft is coupled to the transmission output shaft; whereas with the loose wheel of the sixth gearwheel plane positioned on the transmission output shaft there is associated a fifth interlocking shifting element in such manner that when the fifth interlocking shifting element is closed, the loose wheel of the sixth gearwheel plane positioned on the transmission output shaft is coupled to the transmission output shaft; whereas with the loose wheel of the second gearwheel plane positioned on the countershaft and with the loose wheel of the third gearwheel plane positioned on the countershaft there is associated a sixth interlocking shifting element in such manner that when the sixth interlocking shifting element is closed, the loose wheels of the second and third gearwheel planes positioned on the countershaft are coupled; whereas with the loose wheel of the third gearwheel plane positioned on the countershaft and the loose wheel of the fourth gearwheel plane positioned on the countershaft there is associated a seventh interlocking shifting element in such manner that when the seventh interlocking shifting element is closed, the loose wheels of the third and fourth gearwheel planes positioned on the countershaft are coupled; and whereas with the loose wheel of the fourth gearwheel plane positioned on the countershaft there is associated an eighth interlocking shifting element in such manner that when the eighth interlocking shifting element is closed, the loose wheel of the fourth gearwheel plane positioned on the countershaft is coupled to the countershaft.

This design of the six gearwheel planes and interconnection of the eight interlocking shifting elements with the six gearwheel planes makes it possible particularly advantageously to provide between six and eight forward gears and two reverse gears, and this without modifying the number of gearwheel planes and shifting elements. Accordingly, the dual-clutch transmission according to the invention can be used exceptionally flexibly.

BRIEF DESCRIPTION OF THE DRAWINGS

Preferred further developments emerge from the description given below.

Example embodiments of the invention, to which it is not limited, are explained in greater detail with reference to the drawings, which show:

FIG. 2: A first shifting matrix for the dual-clutch transmission of FIG. 1;

FIG. 3: A second shifting matrix for the dual-clutch transmission of FIG. 1;

FIG. 4: A third shifting matrix for the dual-clutch transmission of FIG. 1.

DETAILED DESCRIPTION OF THE PREFERRED EMBODIMENTS

Figure 1:
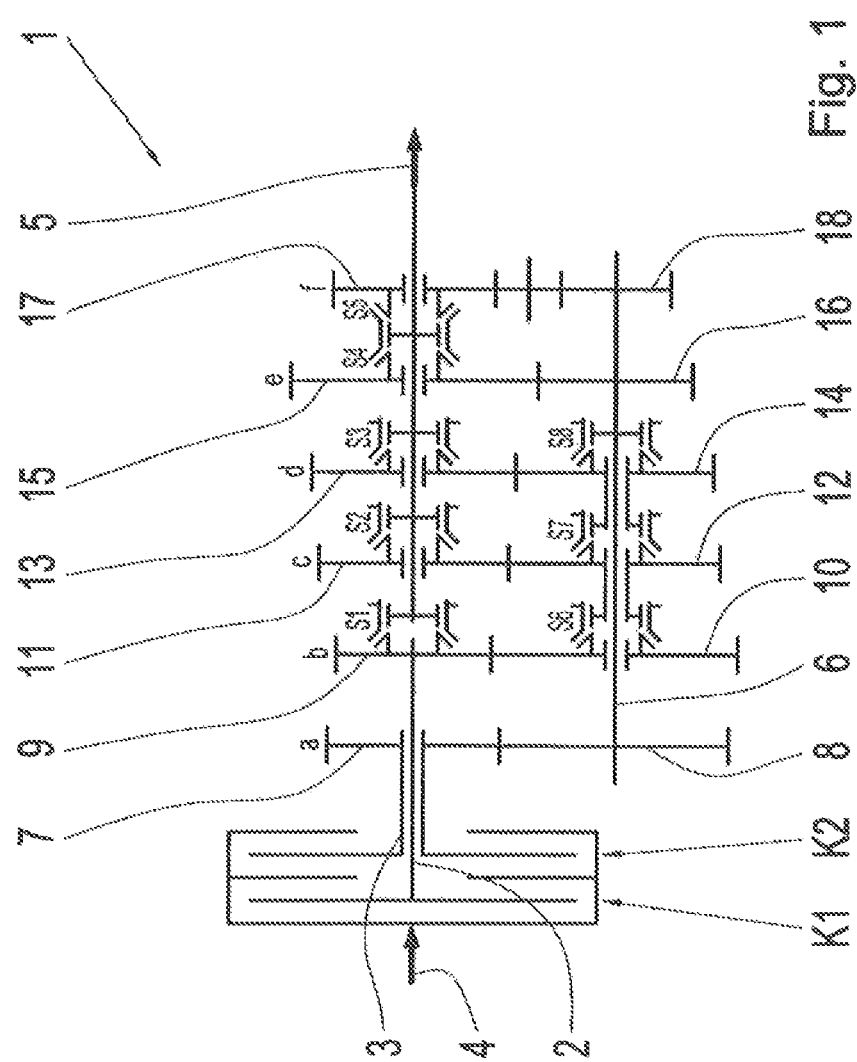
FIG. 1: A schematic representation of a dual-clutch transmission according to the invention.

FIG. 1 shows a dual-clutch transmission 1 according to the invention for providing six or seven or eight forward gears and two reverse gears.

The dual-clutch transmission 1 comprises a first partial transmission and a second partial transmission, the first partial transmission being associated with a first transmission input shaft 2 and the second partial transmission being associated with a second, separate transmission input shaft 3. The first transmission input shaft 2 of the first partial transmission cooperates with a first frictional powershift clutch K1 and the second, separate transmission input shaft 3 cooperates with a second frictional powershift clutch K2, namely in such manner that when the first frictional powershift clutch K1 is closed, the first transmission input shaft 2 and hence the first partial transmission are coupled to a drive input shaft 4, whereas when the second frictional powershift clutch K2 is closed, the second transmission input shaft 3 and hence the second partial transmission are coupled to the drive input shaft 4. Either the first frictional powershift clutch K1 or the second frictional powershift clutch K2 is closed, so that either the first partial transmission or the second partial transmission is coupled to the drive input shaft 4. If both powershift clutches K1 and K2 are open, the dual-clutch transmission 1 is decoupled from the drive input shaft 4.

The second transmission input shaft 3 is in the form of a hollow shaft, which surrounds part of the first transmission input shaft 2, preferably made as a solid shaft, coaxially on the outside.

A common transmission output shaft 5 cooperates with the two partial transmissions of the dual-clutch transmission 1. The transmission output shaft 5 extends coaxially with the two transmission input shafts 2 and 3, being positioned behind them, and is preferably made as a solid shaft.

The two partial transmissions of the dual-clutch transmission 1 comprise a total of six gearwheel planes a, b, c, d, e and f arranged axially one behind another, these having a number of intermeshing gearwheels, wherein the gearwheels of the gearwheel planes a to f are positioned on the first transmission input shaft 2, the second transmission input shaft 3, the transmission output shaft 5 and on a countershaft 6 of the dual-clutch transmission 1 that extends axis-parallel to the transmission shafts 2, 3 and 5. Depending on the shifting position of the eight interlocking shifting elements S1, S2, S3, S4, S5, S6, S7 and S8 provided in order to obtain the forward and reverse gears, the six gearwheel planes a to f participate in the torque transmission starting from the drive input shaft 4 in the direction toward the transmission output shaft 5.

As already stated, the six gearwheel planes a, b, c, d, e and f are arranged axially one behind another and have gearwheels that mesh with one another.

A gearwheel 7 positioned on the second transmission input shaft 3 and a gearwheel 8 positioned on the countershaft 6 are each in the form of a fixed wheel and both belong to a first gearwheel plane a which is the shortest distance away from the drive input shaft 4 as viewed from the drive input shaft.

A gearwheel 9, which is positioned on the first transmission input shaft 2 and belongs to a second gearwheel plane b, which when viewed from the drive input shaft 4 is the second-shortest distance away from the drive input shaft 4, is a fixed wheel and meshes with a gearwheel 10 of the second gearwheel plane b, which is a loose wheel positioned on the countershaft 6.

A gearwheel 11 positioned on the transmission output shaft 5 and a gearwheel 12 positioned on the countershaft 6, both belonging to a third gearwheel plane c, which when viewed from the drive input shaft 4 is the third-shortest distance away from the drive input shaft 4, are each loose wheels which mesh with one another.

A gearwheel 13 positioned on the transmission output shaft 5 and a gearwheel 14 positioned on the countershaft 6, both belonging to a fourth gearwheel plane d, which when viewed from the drive input shaft 4 is the third-largest distance away from the drive input shaft 4, are each loose wheels which mesh with one another.

A gearwheel 15 positioned on the transmission output shaft 5, belonging to a fifth gearwheel plane e as viewed from the drive input shaft 4, the gearwheel plane being the second-largest distance away from the drive input shaft 4, is a loose wheel and meshes with a gearwheel 16 which is a fixed wheel positioned on the countershaft 6 and which belongs to the fifth gearwheel plane e.

A gearwheel 17 that is positioned on the transmission output shaft 5 and belongs to a sixth gearwheel plane f, which as viewed from the drive input shaft 4 is the largest distance away from the drive input shaft 4, is a loose wheel and meshes with a gearwheel 18 which is a fixed wheel positioned on the countershaft 6 and which belongs to the sixth gearwheel plane f.

In the area of the second gearwheel plane b there is associated with the first transmission input shaft 2 a first interlocking shifting element S1. When the first interlocking shifting element S1 is closed, the first transmission input shaft 2 is directly coupled to the transmission output shaft 5, without interposition of any gearwheel planes and hence transmission ratios.

Associated with the loose wheel 11 of the third gearwheel plane c, which loose wheel is positioned on the transmission output shaft 5, there is a second interlocking shifting element S2, such that when the second interlocking shifting element S2 is closed, the loose wheel 11 of the third gearwheel plane c that is positioned on the transmission output shaft 5 is coupled to the transmission output shaft 5.

Associated with the loose wheel 13 of the fourth gearwheel plane d, which loose wheel is positioned on the transmission output shaft 5, there is a third interlocking shifting element S3. When the third interlocking shifting element S3 is closed, the loose wheel 13 of the fourth gearwheel plane d positioned on the transmission output shaft 5 is coupled to the transmission output shaft 5.

Likewise, associated with the loose wheels 15 and 17 of the fifth gearwheel plane e and the sixth gearwheel plane f there are interlocking shifting elements S4 and S5, namely the fourth interlocking shifting element S4 associated with the loose wheel 15 of the fourth gearwheel plane e and the fifth interlocking shifting element S5 associated with the loose wheel 17 of the sixth gearwheel plane f. When the fourth interlocking shifting element S4 is closed, the loose wheel 15 of the fifth gearwheel plane e on the transmission output shaft 5 is coupled to the transmission output shaft 5. When the fifth interlocking shifting element 35 is closed, the loose wheel 17 of the sixth gearwheel plane f on the transmission output shaft 5 is coupled to the transmission output shaft 5.

In addition to the five interlocking shifting element S1, 32, S3, 34 and 35 mentioned above, three further interlocking shifting elements S6, S7 and S9 are provided, which are associated with the countershaft 6.

Thus, the sixth interlocking shifting element S6 is associated with the loose wheel 10 of the second gearwheel plane b and with the loose wheel 12 of the third gearwheel plane c, both gearwheels being positioned on the countershaft 6, in such manner that when the sixth interlocking shifting element S6 is closed, the loose wheels 10, 12 of the second gearwheel plane b and of the third gearwheel plane c positioned on the countershaft 6 are coupled to one another.

A seventh interlocking shifting element S7 is associated with the loose wheel 12 of the third gearwheel plane c and with the loose wheel 14 of the fourth gearwheel plane d, both gearwheels being positioned on the countershaft 6, in such manner that when the seventh interlocking shifting element S7 is closed, the loose wheels 12, 14 of the third gearwheel plane c and of the fourth gearwheel plane d positioned on the countershaft 6 are coupled to one another.

In addition, an eighth interlocking shifting element S8 is associated with the loose wheel 14 of the fourth gearwheel plane d positioned on the countershaft 6, in such manner that when the eighth interlocking shifting element S8 is closed, the loose wheel 14 of the fourth gearwheel plane d on the countershaft 6 is coupled to the countershaft 6.

In the preferred example embodiment shown in FIG. 1, the first interlocking shifting element S1 and the sixth interlocking shifting element S6 are arranged between the second gearwheel plane b and the third gearwheel plane c. The second interlocking shifting element S2 and the seventh interlocking shifting element S7 are arranged between the third gearwheel plane c and the fourth gearwheel plane d. The third interlocking shifting element S3 and the eighth interlocking shifting element S8 are arranged between the fourth gearwheel plane d and the fifth gearwheel plane e. The fourth interlocking shifting element S4 and the fifth interlocking shifting element 85 are arranged between the fifth gearwheel plane e and the sixth gearwheel plane f, and in the example embodiment shown they are combined in a dual shifting element. Only one at a time of the shifting elements combined in a dual shifting element is closed.

In contrast to the example embodiment shown in FIG. 1, it is possible for either the first interlocking shifting element S1 and the second interlocking shifting element S2, or alternatively the second interlocking shifting element S2 and the third interlocking shifting element S3 to be combined in a dual shifting element.

When the two shifting elements S1 and S2 are combined in a dual shifting element, the dual shifting element is arranged between the second gearwheel plane b and the third gearwheel plane c.

In contrast, when the two shifting elements S2 and S3 are combined in a dual shifting element, the dual shifting element is arranged between the third and fourth gearwheel planes c and d.

With the dual-clutch transmission 1 shown in FIG. 1, which comprises the above-mentioned six gearwheel planes a to f and the above-mentioned eight interlocking shifting elements S1 to S8 as well as the two frictional powershift clutches K1 and K2, six forward gears or seven forward gears or eight forward gears and in each case two reverse gears can be obtained, and this without the need for modifications of the gearsets and the shifting elements. If needs be, the transmission ratios of the gearsets can differ from one another depending on the number of forward gears to be provided.

The invention proposes a universal gearset for a dual-clutch transmission, which has a lightweight, inexpensive and robust structure with a good power-to-weight ratio.

FIG. 2 shows a first possible shifting matrix for the dual-clutch transmission of FIG. 1, which serves to provide six forward gears and two reverse gears, such that in the shifting matrix of FIG. 2 those powershift elements K1, K2 and those interlocking shifting elements S1 to S8 which are closed in a respective gear are indicated by a cross. In the case when according to the shifting matrix of FIG. 2 six forward gears are provided, the last forward gear, i.e. the sixth forward gear is a direct gear.

In the first forward gear 1 of the shifting matrix of FIG. 2, only the second frictional powershift clutch K2 and the fourth interlocking shifting element S4 are closed.

In the second forward gear 2, only the first frictional powershift clutch K1 and the third, sixth and seventh interlocking shifting elements S3, S6 and S7 are closed.

In the third forward gear 3, only the second frictional powershift clutch K2 and the third and eighth interlocking shifting elements S3, S8 are closed.

In the fourth forward gear 4, only the first frictional powershift clutch K1 and the second and sixth interlocking shifting elements S2, S6 are closed.

In the fifth forward gear 5, only the second frictional powershift clutch K2 and the second, seventh and eighth interlocking shifting elements S2, S7 and S8 are closed.

In the sixth forward gear 6, which when there are six forward gears is a direct gear, only the first frictional powershift clutch K1 and the first interlocking shifting element S1 are closed.

In the first reverse gear R1, only the first frictional powershift clutch K1 and the fifth, sixth, seventh and eighth interlocking shifting elements S5 to S8 are closed.

In the second reverse gear R2, only the second powershift clutch K2 and the fifth interlocking shifting element S5 are closed.

As already stated, with the dual-clutch transmission 1 of FIG. 1 it is also possible to provide a total of seven forward and two reverse gears, namely using the shifting matrix of FIG. 3.

The shifting matrix of FIG. 3 differs from the shifting matrix of FIG. 2 only in that a further forward gear, namely the forward gear 7 is provided, this being in the form of an overdrive gear, such that in the seventh forward gear 7 only the second frictional powershift clutch K2 and the first, sixth, seventh and eighth interlocking shifting elements S1, S6, S7 and S8 are closed. The other gears of the shifting matrix of FIG. 3 are obtained in the same way as the gears of the shifting matrix of FIG. 2.

Likewise, with the dual-clutch transmission of FIG. 1 eight forward gears and two reverse gears can be obtained, namely by using the shifting matrix of FIG. 4.

In this case the forward gears 2 to 8 of the shifting matrix of FIG. 4 correspond to the forward gears 1 to 7 of the shifting matrix of FIG. 3. Likewise, the reverse gears R1 and R2 are obtained in the same way. The shifting matrix of FIG. 4 differs from the shifting matrix of FIG. 3 only in that in the shifting matrix of FIG. 4 there is a new first gear, in which only the first frictional powershift clutch K1 and four interlocking shifting elements, namely the shifting elements 34, S6, S7 and S8 are closed. Also in the shifting matrix of FIG. 4, the highest gear is an overdrive gear. The second-highest gear is a direct gear.

The forward gears of the dual-clutch transmission 1 can all be powershifted.

In combination with a downstream group or range group, the dual-clutch transmission of FIG. 1 can be extended to form a group transmission and, for example by using the shifting matrix of FIG. 2, can provide twelve forward gears, by using the shifting matrix of FIG. 3, fourteen forward gears and by using the shifting matrix of FIG. 4, sixteen forward gears. Such a downstream group or range group, which provides a 'low' driving stage and a 'high' driving stage, can for example be in the form of a planetary gearset.

INDEXES

1 Dual-clutch transmission
2 Transmission input shaft
3 Transmission input shaft
4 Drive input shaft
5 Transmission output shaft
6 Countershaft
7 Gearwheel
8 Gearwheel
9 Gearwheel
10 Gearwheel
11 Gearwheel
12 Gearwheel
13 Gearwheel
14 Gearwheel
15 Gearwheel
16 Gearwheel
17 Gearwheel
18 Gearwheel
a Gearwheel plane
b Gearwheel plane
c Gearwheel plane
d Gearwheel plane
e Gearwheel plane
f Gearwheel plane
K1 Powershift clutch
K2 Powershift clutch
S1 Shifting element
S2 Shifting element
S3 Shifting element
S4 Shifting element
S5 Shifting element
S6 Shifting element
S7 Shifting element
S8 Shifting element

The invention claimed is:

1. A dual-clutch transmission (1) comprising:
a first partial transmission and a second partial transmission;
a first transmission input shaft (2) for the first partial transmission and a separate, second transmission input shaft (3) for the second partial transmission;
a first frictional powershift clutch (K1) is associated with the first transmission input shaft (2) which, when engaged, couples the first transmission input shaft (2) and the first partial transmission to a drive input shaft (4);
a second frictional powershift clutch (K2) is associated with the second transmission input shaft (3) which, when engaged, couples the second transmission input shaft (3) and the second partial transmission to the drive input shaft (4);
a common transmission output shaft (5) for both of the first and the second partial transmissions;
the second transmission input shaft (3) is a hollow shaft which is coaxial with and partially surrounds, radially on an outside, the first transmission input shaft (2);
the transmission output shaft (5) is coaxially with and is arranged axially behind the first transmission input shaft (2) and the second transmission input shaft (3);
six gearwheel planes (a, b, c, d, e, f) being arranged sequentially, one behind another, to produce at least two reverse gears and either six forward gears, seven forward gears or eight forward gears,
gearwheels are positioned on either the first transmission input shaft (2), the second transmission input shaft (3), the transmission output shaft (5) and on a countershaft (6), the countershaft (6) extends parallel to the first and the second transmission input shafts and the transmission output shaft, and the gearwheels participate in torque transmission starting from the drive input shaft (4) in a direction toward the transmission output shaft (5), depending on shifting positions of eight interlocking shifting elements (S1, S2, S3, S4, S5, S6, S7, S8);
when six forward gears are provided, either a last or a sixth forward gear is a direct gear, and
when either seven or eight forward gears are provided, a last or, respectively, a seventh or an eighth forward gear is an overdrive gear.

2. The dual-clutch transmission according to claim 1, wherein
a first gearwheel (7), positioned on the second transmission input shaft (3), and a second gearwheel (8), positioned on the countershaft (6), are both fixed gearwheels and form part of a first gearwheel plane (a), as viewed from the drive input shaft (4), located closest to the drive input shaft (4);
a third gearwheel (9), positioned on the first transmission input shaft (2), is a fixed gearwheel and forms part of a second gearwheel plane (b), as viewed from the drive input shaft (4), located second closest to the drive input shaft (4), and a fourth gearwheel (10), positioned on the countershaft (6), is a loose wheel and forms part of the second gearwheel plane (b);
a fifth gearwheel (11), positioned on the transmission output shaft (5), and a sixth gearwheel (12), positioned on the countershaft (6), are both loose wheels, and both the fifth and the sixth loose wheels form part of a third gearwheel plane (c), as viewed from the drive input shaft (4);

a seventh gearwheel (13), positioned on the transmission output shaft (5), and an eighth gearwheel (14), positioned on the countershaft (6), form a fourth gearwheel plane (d), as viewed from the drive input shaft (4), and both of the seventh and eighth gearwheels are loose wheels;

a ninth gearwheel (15), positioned on the transmission output shaft (5), is a loose wheel and forms part of a fifth gearwheel plane (e), the fifth gearwheel plane (e), as viewed from the drive input shaft (4), is located second furthest away from the drive input shaft (4), and a tenth gearwheel (16), positioned on the countershaft (6), is a fixed wheel and forms part of the fifth gearwheel plane (e); and an eleventh gearwheel (17), positioned on the transmission output shaft (5), is a loose wheel and forms part of a sixth gearwheel plane (f), the sixth gearwheel plane (f), as viewed from the drive input shaft (4), is located furthest away from the drive input shaft (4), and a twelfth gearwheel (18), positioned on the countershaft (6), is a fixed wheel and forms part of the sixth gearwheel plane (f).

3. The dual-clutch transmission according to claim 2, wherein
in an area of the second gearwheel plane (b), the first transmission input shaft (2) is associated with a first interlocking shifting element (S1) such that when the first interlocking shifting element (S1) is engaged, the first transmission input shaft (2) is coupled to the transmission output shaft (5);

the fifth loose wheel (11) of the third gearwheel plane (c), positioned on the transmission output shaft (5), is associated with a second interlocking shifting element (S2) such that when the second interlocking shifting element (S2) is engaged, the fifth loose wheel (11) of the third gearwheel plane (c), positioned on the transmission output shaft (5), is coupled to the transmission output shaft (5);

the seventh loose wheel (13) of the fourth gearwheel plane (d), positioned on the transmission output shaft (5), is associated with a third interlocking shifting element (S3) such that when the third interlocking shifting element (S3) is engaged, the seventh loose wheel (13) of the fourth gearwheel plane (d), positioned on the transmission output shaft (5), is coupled to the transmission output shaft (5);

the ninth loose wheel (15) of the fifth gearwheel plane (e), positioned on the transmission output shaft (5), is associated with a fourth interlocking shifting element (S4) such that when the fourth interlocking shifting element (S4) is engaged, the ninth loose wheel (15) of the fifth gearwheel plane (e), positioned on the transmission output shaft (5), is coupled to the transmission output shaft (5);

the eleventh loose wheel (17) of the sixth gearwheel plane (f), positioned on the transmission output shaft (5), is associated with a fifth interlocking shifting element (S5) such that when the fifth interlocking shifting element (S5) is engaged, the eleventh loose wheel (17) of the sixth gearwheel plane (f), positioned on the transmission output shaft (5), is coupled to the transmission output shaft (5);

a sixth interlocking shifting element (S6) is associated with the fourth loose wheel (10) of the second gearwheel plane (b) and the sixth loose wheel (12) of the third gearwheel plane (c), both positioned on the countershaft (6), such that when the sixth interlocking shifting element (S6) is engaged, the fourth and sixth loose wheels (10, 12) of the second gearwheel plane (b) and of the third gearwheel plane (c), positioned on the countershaft (6), are coupled to one another;

a seventh interlocking shifting element (S7) is associated with the loose sixth wheel (12) of the third gearwheel plane (c) and the eighth loose wheel (14) of the fourth gearwheel plane (d), both positioned on the countershaft (6), such that when the seventh interlocking shifting element (S7) is engaged, the sixth and eighth loose wheels (12, 14) of the third gearwheel plane (c) and of the fourth gearwheel plane (d), positioned on the countershaft (6), are coupled to one another; and an eighth interlocking shifting element (S8) is associated with the eighth loose wheel (14) of the fourth gearwheel plane (d), positioned on the countershaft (6), such that when the eighth interlocking shifting element (S8) is engaged, the eighth loose wheel (14) of the fourth gearwheel plane (d), positioned on the countershaft (6), is coupled to the countershaft (6).

4. The dual-clutch transmission according to claim 3, wherein the dual-clutch transmission has either six or seven forward gears and the two reverse gears,
a first forward gear is implemented by engagement of only the second frictional powershift clutch (K2) and the fourth interlocking shifting element (S4);
a second forward gear is implemented by engagement of only the first frictional powershift clutch (K1) and the third, the sixth and the seventh interlocking shifting elements (S3, S6, S7);
a third forward gear is implemented by engagement of only the second frictional powershift clutch (K2) and the third and the eighth interlocking shifting elements (S3, S8);
a fourth forward gear is implemented by engagement of only the first frictional powershift clutch (K1) and the second and the sixth interlocking shifting elements (S2, S6);
a fifth forward gear is implemented by engagement of only the second frictional powershift clutch (K2) and the second, the seventh and the eighth interlocking shifting elements (S2, S7, S8);
a sixth forward gear is implemented by engagement of only the first frictional powershift clutch (K1) and the first interlocking shifting element (S1);
a first reverse gear is implemented by engagement of only the first frictional powershift clutch (K1) and the fifth, the sixth, the seventh and the eighth interlocking shifting elements (S5, S6, S7, S8); and
a second reverse gear is implemented by engagement of only the second frictional powershift clutch (K2) and the fifth interlocking shifting element (S5).

5. The dual-clutch transmission according to claim 4, wherein the dual-clutch transmission has seven forward gears, and
a seventh forward gear is implemented by engagement of only the second frictional powershift clutch (K2) and the first, the sixth, the seventh and the eighth interlocking shifting elements (S1, S6, S7, S8).

6. The dual-clutch transmission according to claim 3, wherein the dual-clutch transmission has eight forward gears and the two reverse gears,
a first forward gear is implemented by engagement of only the first frictional powershift clutch (K1) and the fourth, the sixth, the seventh and the eighth interlocking shifting elements (S4, S6, S7, S8);
a second forward gear is implemented by engagement of only the second frictional powershift clutch (K2) and the fourth interlocking shifting element (S4);
a third forward gear is implemented by engagement of only the first frictional powershift clutch (K1) and the third, the sixth and the seventh interlocking shifting elements (S3, S6, S7);
a fourth forward gear is implemented by engagement of only the second frictional powershift clutch (K2) and the third and the eighth interlocking shifting elements (S3, S8);
a fifth forward gear is implemented by engagement of only the first frictional powershift clutch (K1) and the second and the sixth interlocking shifting elements (S2, S6);
a sixth forward gear is implemented by engagement of only the second frictional powershift clutch (K2) and the second, the seventh and the eighth interlocking shifting elements (S2, S7, S8);
a seventh forward gear is implemented by engagement of only the first frictional powershift clutch (K1) and the first interlocking shifting element (S1);
an eighth forward gear is implemented by engagement of only the second frictional powershift clutch (K2) and the first, the sixth, the seventh and the eighth interlocking shifting elements (S1, S6, S7, S8);
a first reverse gear is implemented by engagement of only the first frictional powershift clutch (K1) and the fifth, the sixth, the seventh and the eighth interlocking shifting elements (S5, S6, S7, S8); and
a second reverse gear is implemented by engagement of only the second frictional powershift clutch (K2) and the fifth interlocking shifting element (S5).

7. The dual-clutch transmission according to claim 3, wherein either:
the first interlocking shifting element (S1) and the second interlocking shifting element (S2), or
the second interlocking shifting element (S2) and the third interlocking shifting element (S3)
are combined as a dual shifting element.

8. The dual-clutch transmission according to claim 3, wherein the fourth interlocking shifting element (S4) and the fifth interlocking shifting element (S5) are combined as a dual shifting element.

9. A dual-clutch transmission (1) comprising:
a first partial transmission having a first transmission input shaft which is coaxially arranged with and extends through a hollow second transmission input shaft of a second partial transmission;
a first frictional powershift clutch, which is engagable to couple the first transmission input shaft to a drive input shaft, and a second frictional powershift clutch, which is engagable to couple the second transmission input shaft to the drive input shaft;
a transmission output shaft being coaxially aligned with the first and the second input shafts and arranged downstream therefrom with respect to torque flow through the dual-clutch transmission;
first, second, third, fourth, fifth and sixth gearwheel planes are sequentially axially arranged within the dual-clutch transmission and comprise a plurality of gearwheels that are supported on the first and the second transmission input shafts, the transmission output shaft and a countershaft, which extends parallel to the first and the second transmission input shafts and the transmission output shaft;
first, second, third, fourth, fifth, sixth, seventh and eighth interlocking shifting elements being selectively engagable so as to transmit torque from the drive input shaft to the drive output shaft and implement between six and eight forward gears and two reverse gears;
when the dual-clutch transmission only has six forward gears, then a last forward gear is a direct drive gear; and
when the dual-clutch transmission only has either seven or eight forward gears, then a last forward gear is an overdrive gear and a second to the last forward gear is direct drive gear.

10. The dual-clutch transmission according to claim 9, wherein the first and the second transmission input shafts, the transmission output shaft and the countershaft support first, second, third, fourth, fifth, sixth, seventh, eighth, ninth, tenth, eleventh and twelfth gearwheels;
the first, the second, the third, the fourth, the fifth and the sixth gearwheel planes are arranged axially, from closest to the drive input shaft to furthest away from the drive input shaft, in a sequence of the first gearwheel plane, the second gearwheel plane, the third gearwheel plane, the fourth gearwheel plane, the fifth gearwheel plane and the sixth gearwheel plane;
the first and the second gearwheels are arranged to form the first gearwheel plane, and the first gearwheel is rotationally fixed to the second transmission input shaft and the second gearwheel is rotationally fixed to the countershaft;
the third and the fourth gearwheels are arranged to form the second gearwheel plane, and the third gearwheel is rotationally fixed to the first transmission input shaft and the fourth gearwheel is rotatably supported by the countershaft
the fifth and the sixth gearwheels are arranged to form the third gearwheel plane, and the fifth gearwheel is rotatably supported by the transmission output shaft and the sixth gearwheel is rotatably supported by the countershaft;
the seventh and the eighth gearwheels are arranged to form the fourth gearwheel plane, and the seventh gearwheel is rotatably supported by the transmission output shaft and the eighth gearwheel is rotatably supported by the countershaft;
the ninth and the tenth gearwheels are arranged to form the fifth gearwheel plane, and the ninth gearwheel is rotatably supported by the transmission output shaft and the tenth gearwheel is rotationally fixed to the countershaft; and
the eleventh and the twelfth gearwheels are arranged to form the sixth gearwheel plane, and the eleventh gearwheel is rotatably supported by the transmission output shaft and the twelfth gearwheel is rotationally fixed to the countershaft.

11. The dual-clutch transmission according to claim 10, wherein
the first interlocking shifting element is arranged adjacent to the second gearwheel plane and is associated with the first transmission input shaft such that engagement of the first interlocking shifting element couples the first transmission input shaft to the transmission output shaft;
the fifth gearwheel is associated with the second interlocking shifting element such that engagement of the second interlocking shifting element couples the fifth gearwheel to the transmission output shaft the seventh gearwheel is associated with the third interlocking shifting element such that engagement of the third interlocking shifting element couples the seventh gearwheel to the transmission output shaft;

the ninth gearwheel is associated with the fourth interlocking shifting element such that engagement of the fourth interlocking shifting element couples the ninth gearwheel to the transmission output shaft;

the eleventh gearwheel is associated with the fifth interlocking shifting element such that engagement of the fifth interlocking shifting element couples the eleventh gearwheel to the transmission output shaft;

the fourth gearwheel and the sixth gearwheel are associated with the sixth interlocking shifting element such that engagement of the sixth interlocking shifting element couples the fourth gearwheel and the sixth gearwheel to one another;

the sixth gearwheel and the eighth gearwheel are associated with the seventh interlocking shifting element such that engagement of the seventh interlocking shifting element couples the sixth gearwheel and the eighth gearwheel to one another; and the eighth gearwheel is associated with the eighth interlocking shifting element such that engagement of the eighth interlocking shifting element couples the eighth gearwheel to the countershaft.

12. The dual-clutch transmission according to claim 11, wherein the first and the second frictional powershift clutches and the first, the second, the third, the fourth, the fifth, the sixth, the seventh and the eighth interlocking shifting elements are selectively engagable to implement first, second, third, fourth, fifth and sixth forward gears and first and second reverse gears;

the first forward gear is implemented by engagement of the second frictional powershift clutch and the fourth interlocking shifting element;

the second forward gear is implemented by engagement of the first frictional powershift clutch and the third, the sixth and the seventh interlocking shifting elements;

the third forward gear is implemented by engagement of the second frictional powershift clutch and the third and the eighth interlocking shifting elements;

the fourth forward gear is implemented by engagement of the first frictional powershift clutch and the second and the sixth interlocking shifting elements;

the fifth forward gear is implemented by engagement of the second frictional powershift clutch and the second, the seventh and the eighth interlocking shifting elements;

the sixth forward gear is a direct gear and is implemented by engagement of the first frictional powershift clutch and the first interlocking shifting element;

the first reverse gear is implemented by engagement of the first frictional powershift clutch and the fifth, the sixth, the seventh and the eighth interlocking shifting elements; and the second reverse gear is implemented by engagement of the second frictional powershift clutch and the fifth interlocking shifting element.

13. The dual-clutch transmission according to claim 12, wherein the dual-clutch transmission has a seventh forward gear, and the seventh forward gear is implemented as an overdrive gear by engagement of the second frictional powershift clutch and the first, the sixth, the seventh and the eighth interlocking shifting elements.

14. The dual-clutch transmission according to claim 11, wherein the first and the second frictional powershift clutches and the first, the second, the third, the fourth, the fifth, the sixth, the seventh and the eighth interlocking shifting elements are selectively engagable to implement first, second, third, fourth, fifth, sixth, seventh and eighth forward gears and first and second reverse gears;

the first forward gear is implemented by engagement of the first frictional powershift clutch, and the fourth, the sixth, the seventh and the eighth interlocking shifting elements;

the second forward gear is implemented by engagement of the second frictional powershift clutch and the fourth interlocking shifting element;

the third forward gear is implemented by engagement of the first frictional powershift clutch and the third, the sixth and the seventh interlocking shifting elements;

the fourth forward gear is implemented by engagement of the second frictional powershift clutch and the third and the eighth interlocking shifting elements;

the fifth forward gear is implemented by engagement of the first frictional powershift clutch and the second and the sixth interlocking shifting elements;

the sixth forward gear is implemented by engagement of the second frictional powershift clutch and the second, the seventh and the eighth interlocking shifting elements;

the seventh forward gear is a direct gear and is implemented by engagement of the first frictional powershift clutch and the first interlocking shifting element;

the eighth forward gear is implemented by engagement of the second frictional powershift clutch and the first, the sixth, the seventh and the eighth interlocking shifting elements;

the first reverse gear is implemented by engagement of the first frictional powershift clutch and the fifth, the sixth, the seventh and the eighth interlocking shifting elements; and the second reverse gear is implemented by engagement of the second frictional powershift clutch and the fifth interlocking shifting element.

15. The dual-clutch transmission according to claim 1, wherein the dual-clutch transmission has eight forward gears and the two reverse gears, a first forward gear is implemented by engagement of the first frictional powershift clutch (K1), and the fourth, the sixth, the seventh and the eighth interlocking shifting elements (S4, S6, S7, S8);

a second forward gear is implemented by engagement of the second frictional powershift clutch (K2) and the fourth interlocking shifting element (S4);

a third forward gear is implemented by engagement of the first frictional powershift clutch (K1) and the third, the sixth and the seventh interlocking shifting elements (S3, S6, S7);

a fourth forward gear is implemented by engagement of the second frictional powershift clutch (K2) and the third and the eighth interlocking shifting elements (S3, S8);

a fifth forward gear is implemented by engagement of the first frictional powershift clutch (K1) and the second and the sixth interlocking shifting elements (S2, S6);

the sixth forward gear is implemented by engagement of the second frictional powershift clutch (K2) and the second, the seventh and the eighth interlocking shifting elements (S2, S7, S8);

the seventh forward gear is a direct gear and is implemented by engagement of the first frictional powershift clutch (K1) and the first interlocking shifting element (S1);

the eighth forward gear is implemented by engagement of the second frictional powershift clutch (K2) and the first, the sixth, the seventh and the eighth interlocking shifting elements (S1, S6, S7, S8);

the first reverse gear is implemented by engagement of the first frictional powershift clutch (K1) and the fifth, the sixth, the seventh and the eighth interlocking shifting elements (S5, S6, S7, S8); and the second reverse gear is implemented by engagement of the second frictional powershift clutch (K2) and the fifth interlocking shifting element (S5).

* * * * *